(12) United States Patent
McCaffrey et al.

(10) Patent No.: US 7,779,540 B2
(45) Date of Patent: Aug. 24, 2010

(54) APPARATUS AND METHOD FOR QUADRAIL ERGONOMIC ASSEMBLY

(75) Inventors: Michael G. McCaffrey, Windsor, CT (US); Robert P. Rojas, Killingworth, CT (US); Mark F. Zelesky, Bolton, CT (US); Gilbert B. Cutler, Ivoryton, CT (US); Gene V. Flenke, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 1390 days.

(21) Appl. No.: 11/203,026

(22) Filed: Aug. 12, 2005

(65) Prior Publication Data

US 2007/0033795 A1    Feb. 15, 2007

(51) Int. Cl.
*B23Q 7/00* (2006.01)
*B66C 17/00* (2006.01)

(52) U.S. Cl. .................. 29/889.2; 29/429; 29/559; 29/799; 29/822; 29/823; 29/824; 212/316

(58) Field of Classification Search ............... 29/889.2, 29/429, 430, 431, 559, 784, 793, 799, 822, 29/823, 824, 281.4, 464; 414/589, 590, 591; 212/312, 315, 316
See application file for complete search history.

(56) References Cited

U.S. PATENT DOCUMENTS

| | | | |
|---|---|---|---|
| 2,825,477 A * | 3/1958 | Ross ........................... 29/559 |
| 4,395,180 A | 7/1983 | Magnotte |
| 4,781,517 A * | 11/1988 | Pearce et al. ................. 414/590 |
| 4,928,383 A * | 5/1990 | Kaczmarek et al. ........... 29/711 |
| 4,930,213 A * | 6/1990 | Hayakawa et al. ............. 29/793 |
| 4,937,929 A * | 7/1990 | Nokajima et al. .............. 29/430 |
| 4,991,707 A * | 2/1991 | Alexander et al. ........ 198/346.1 |
| 5,123,148 A * | 6/1992 | Ikeda et al. ..................... 29/11 |
| 5,184,766 A * | 2/1993 | Takahashi et al. ............ 228/4.1 |
| 5,383,652 A | 1/1995 | Van Den Berg |
| 5,568,189 A * | 10/1996 | Kneller ........................ 348/144 |
| 5,653,351 A * | 8/1997 | Grout et al. .................. 212/315 |

FOREIGN PATENT DOCUMENTS

| | | |
|---|---|---|
| CN | 1411420 A | 4/2003 |
| DE | 100 02 541 A1 | 7/2001 |
| EP | 1101726 A1 | 5/2001 |
| JP | 01-197167 A | 8/1989 |

(Continued)

OTHER PUBLICATIONS

Chinese Office Action for CN200610141265.9, dated Feb. 20, 2009.
Japanese Office Action for JP2006-171350, dated Jan. 6, 2009.

(Continued)

*Primary Examiner*—Jermie E Cozart
(74) *Attorney, Agent, or Firm*—Bachman & LaPointe, P.C.

(57) ABSTRACT

A quadrail ergonomic apparatus includes two or more pathways designed to permit movement in two or more directions mounted to a static object above a surface. One or more carriages designed to move in two or more directions are disposed within the pathways. Each carriage is suspended above the surface from the pathways and capable of maintaining a workload in place and permitting movement of the workload in at least four directions.

37 Claims, 6 Drawing Sheets

FOREIGN PATENT DOCUMENTS

| | | |
|---|---|---|
| JP | 11-188543 A | 7/1999 |
| JP | 2004-026054 A | 1/2004 |
| WO | 00/02808 A1 | 1/2000 |
| WO | 2004/052715 A2 | 6/2004 |

OTHER PUBLICATIONS

EP Search Report for European Patent Application No. EP062541859, dated Jan. 13, 2010.

New Zealand Examination Report for NZ Patent Application No. 547207, May 18, 2006.

* cited by examiner

APPARATUS AND METHOD FOR QUADRAIL ERGONOMIC ASSEMBLY

FIELD OF USE

This invention relates to an ergonomic assembly process and, more particularly, relates to a quadrail ergonomic assembly process.

BACKGROUND OF THE INVENTION

Each year workers' safety is compromised while operating equipment. In particular, workers operating hoists suffer various injuries, fatal and nonfatal, due to the precarious nature of the hoist itself. The most common hoist is the single point overhead hoist which is suspended from a static structure, existing or otherwise. The worker must attach or cradle the workload using a number of chain falls and cables to the hoist and then exert enough force to lift the workload, suspending the workload in the air. Once suspended, workers may perform various operations upon the workload such as assembling and installing parts. However, such a setup often times compromises the workers' safety, as the suspended, dangling workload may shift its weight and fall or cause an inadvertent part installation miscue.

The single point overhead hoist method has been employed throughout many industries. For instance, gas turbine engine manufacturers employ this method and others such as elevated rails and supports, static posts, and the like, which all employ hoists, to suspend engines and complete their assembly. For instance, elevated rails and supports may ultimately support the engine but a hoist must be employed to effectively place the engine upon the rails. And, static posts require the same hoisting procedure when placing the engine upon the typically used jack stands.

In each instance where a hoist is utilized, a worker's safety may be compromised due to the potential for a suspended, dangling workload to fall. At the same time that a worker's safety is a paramount concern, the engine itself must be assembled precisely and properly. An engine suspended from a hoist may potentially fall, inadvertently knock into another object or static structure, or suffer physical damage as a part to be installed inadvertently slips and falls within the engine. The "foreign object" must then be removed from within the engine and properly installed. However, each time the foreign object contacts an internal part, while falling through the engine; additional repairs may be required.

Consequently, there exists a need for a robust method and apparatus for suspending a workload in order to perform necessary maintenance, assembly and the like.

There also exists a need for a method and apparatus for suspending a workload to permit a worker to perform necessary operations without compromising his or her safety.

There also exists a need for a method and apparatus for suspending a workload to perform necessary maintenance, assembly, and the like, in a more cost effective and time efficient manner.

SUMMARY OF THE INVENTION

In accordance with the present invention, a quadrail ergonomic apparatus broadly comprises two or more pathways designed to permit movement in two or more directions mounted to a static object above a surface; one or more carriages designed to move in two or more directions disposed within the two or more pathways; wherein each carriage is suspended above the surface from the pathways and is capable of maintaining a workload in place and permitting movement of the workload in at least four directions.

In accordance with the present invention, a method for ergonomically assembling an apparatus comprises providing five or more carriages disposed in connection with two or more pathways mounted to a static object above a surface; disposing a workload in one or more of the five or more carriages; positioning each carriage containing the workload in a spatial relationship to one another; and assembling each of the workloads together using each of the carriages to form an apparatus.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

A quadrail ergonomic apparatus for use in assembling a product typically requiring the use of a hoist is described herein. The apparatus and its method of use employs a multiple rail system for suspending several carriages designed to hold parts of a product to be assembled. The carriages possess multiple degrees of freedom of motion in order to maintain, manipulate and orient the part making up the product. One or more workers may then complete assembly of each part, and then assemble the parts suspended within the carriages. The product may be assembled while disposed in a horizontal position. The work zone surrounding the suspended parts is ergonomically optimized by the vertically, axially and rotationally orienting the parts alone, and in combination, throughout the process. Asymmetric turbomachinery may also be assembled with ease due to the rotational capabilities of the carriages described herein as well as the ability to stack parts with core machinery, to variably adjust the height of the parts and core machinery and to flexibly manipulate the centerline of the parts and core machinery. The method for use of the quadrail ergonomic apparatus described herein is not limited to part and/or module level assembly processes, but may also be applicable to production, overhaul and the like.

Each carriage may be capable of generally receiving and maintaining a workload or, more particularly, a part of a product to be assembled. For purposes of the present application, the word "maintaining" is generally understood to mean the ability to secure a part in place, the ability to hold the part in place, and the ability to support or carry the weight of the part for any period of time. Each carriage may operate independently of each other, may be positioned and moved with precision, e.g., within a few thousandths of an inch, in any one of the directions described herein, and each may move at variable speeds alone or in combination with one another within and along the rails. Each carriage may maintain weights up to about 10,000 lbs. The carriages may be outfitted with logic systems and control modules to enable their self-alignment alone and in combination with each other and movement within and along the rails. Such logic systems and control modules are commercially available from Allen-Bradley, part of Rockwell Automation whose headquarters are located in Milwaukee, Wis.

Figure 1:
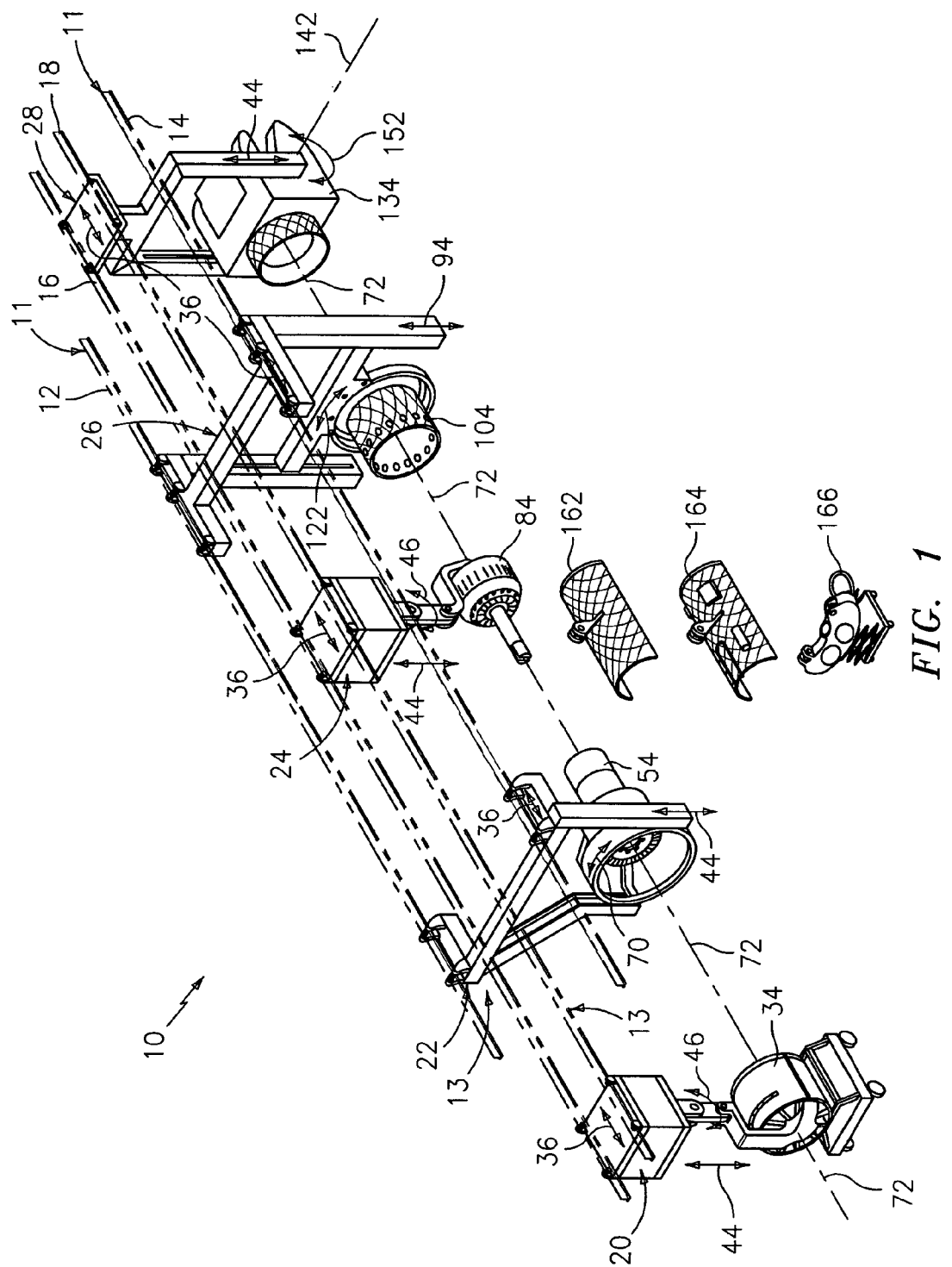
FIG. 1 is a representation of a quadrail ergonomic apparatus for use in the present method.

Referring generally now to FIGS. 1-9, a quadrail ergonomic apparatus of the present invention is illustrated. Referring specifically to FIG. 1, a quadrail ergonomic apparatus 10 generally comprises a first pathway 11 comprising rails 12, 14, and a second pathway 13 comprising rails 16, 18 mounted to a static structure (not shown), that is, a stationary structure such as a ceiling or truss; each rail 12, 14, 16, 18 may be capable of receiving one or more carriages 20, 22, 24, 26, 28 and suspending carriages 20, 22, 24, 26, 28 above a surface (not shown). Each rail 12, 14, 16, 18 may comprise one or more mating features (not shown) capable of receiving a complementary mating feature disposed upon each carriage 20, 22, 24, 26, 28. First pathway 11 may operate independently of second pathway 13, and vice-versa.

Figure 5:
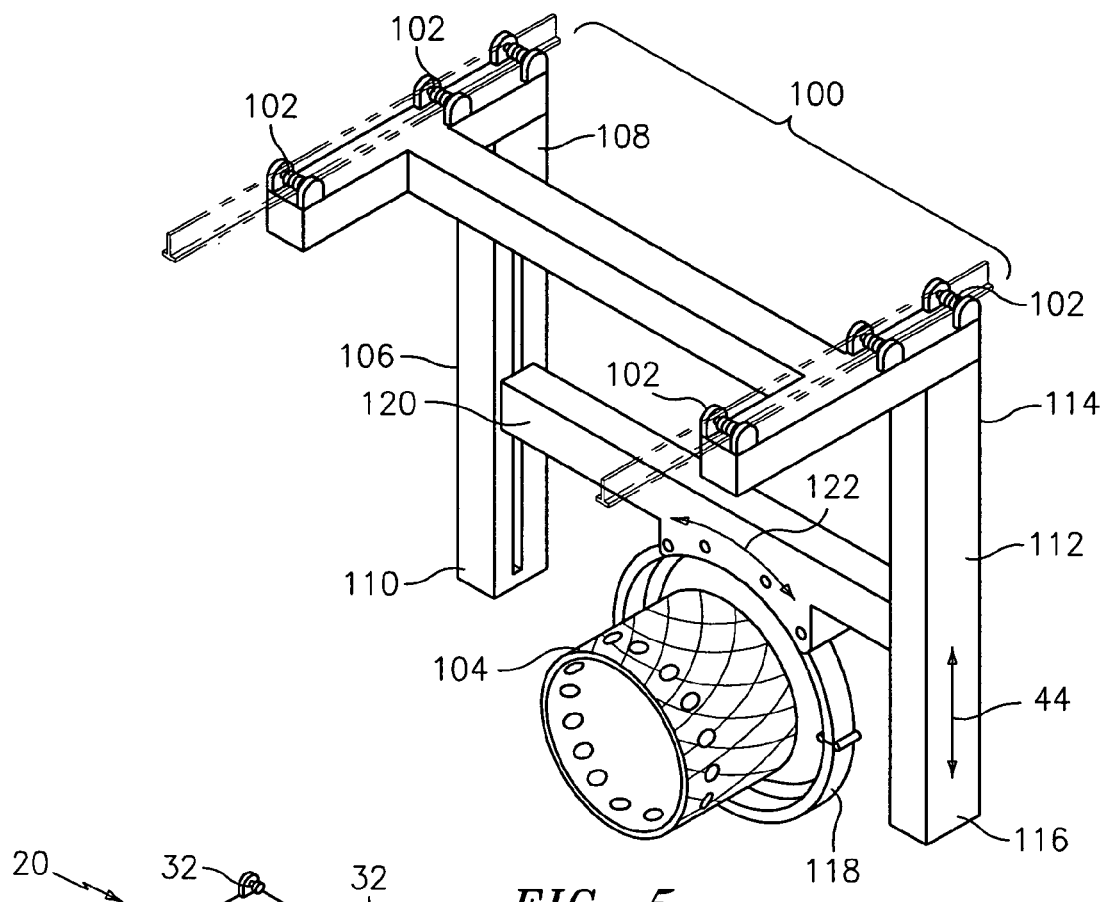
FIG. 5 is a representation of an augmentor duct being received by the fourth carriage of FIG. 1.
Figure 6:
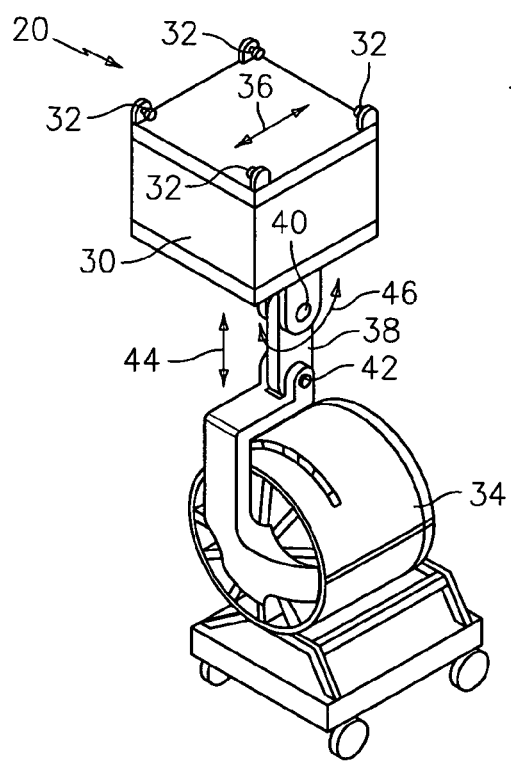
FIG. 6 is a representation of a fan on a loading cart being received by the first carriage of FIG. 1.
Figure 7:
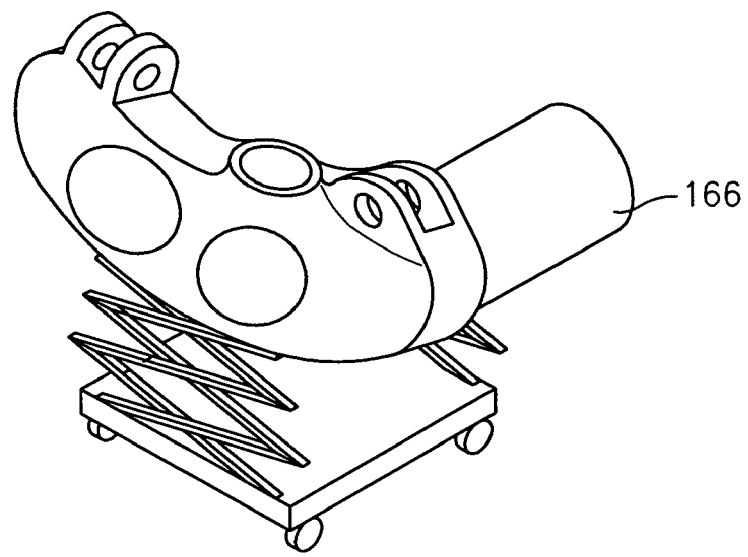
FIG. 7 is a representation of a gearbox.

Referring now to FIGS. 2-8, carriages 20, 22, 24, 26, 28 will now be described more fully. Referring specifically to FIG. 6, first carriage 20 may comprise a body 30, one or more mating features 32 complementary to the mating feature of rails 16, 18 mounted to body 30 and means for suspending a part 34 above the surface and moving part 34 in four or more directions. Complementary mating features 32 may be disposed within rails 16, 18 to permit the movement of first carriage 20 in the direction(s) and range of motion allowed by rails 16, 18. Preferably, the directions and range of motion allowed by rails 16, 18 permit first carriage 20 to move horizontally. However, this movement may be characterized differently depending upon the location of a worker with respect to first carriage 20. For instance, a worker standing on either side of part 34 [disposed within first carriage 20] has the perspective such that first carriage may be moved horizontally within rails 16, 18 in a left-to-right direction and a right-to-left direction as indicated by an arrow 36. In another instance, a worker standing in front of part 34 [disposed within first carriage 20] has the perspective such that first carriage 20 may be moved horizontally within rails 16, 18 in a forward-to-backward direction and a backward-to-forward direction as also indicated by arrow 36. The means for suspending and moving part 34 may comprise an adjustable arm 38 comprising a first end 40 disposed in connection with body 30 and a second end 42 disposed in connection with part 34. Adjustable arm 38 may be capable of permitting part 34 to move vertically upwards and downwards in relation to the surface below as indicated by an arrow 44. In the alternative, adjustable arm 38 may be disposed in connection with body 30 such that a pivot mount, swivel mount, rotatable mount, ball-joint socket mount or any mount permitting the three hundred sixty degree rotation of adjustable arm 38 within body 30 in a clockwise direction and a counter-clockwise direction as indicated by an arrow 46.

Figure 2:
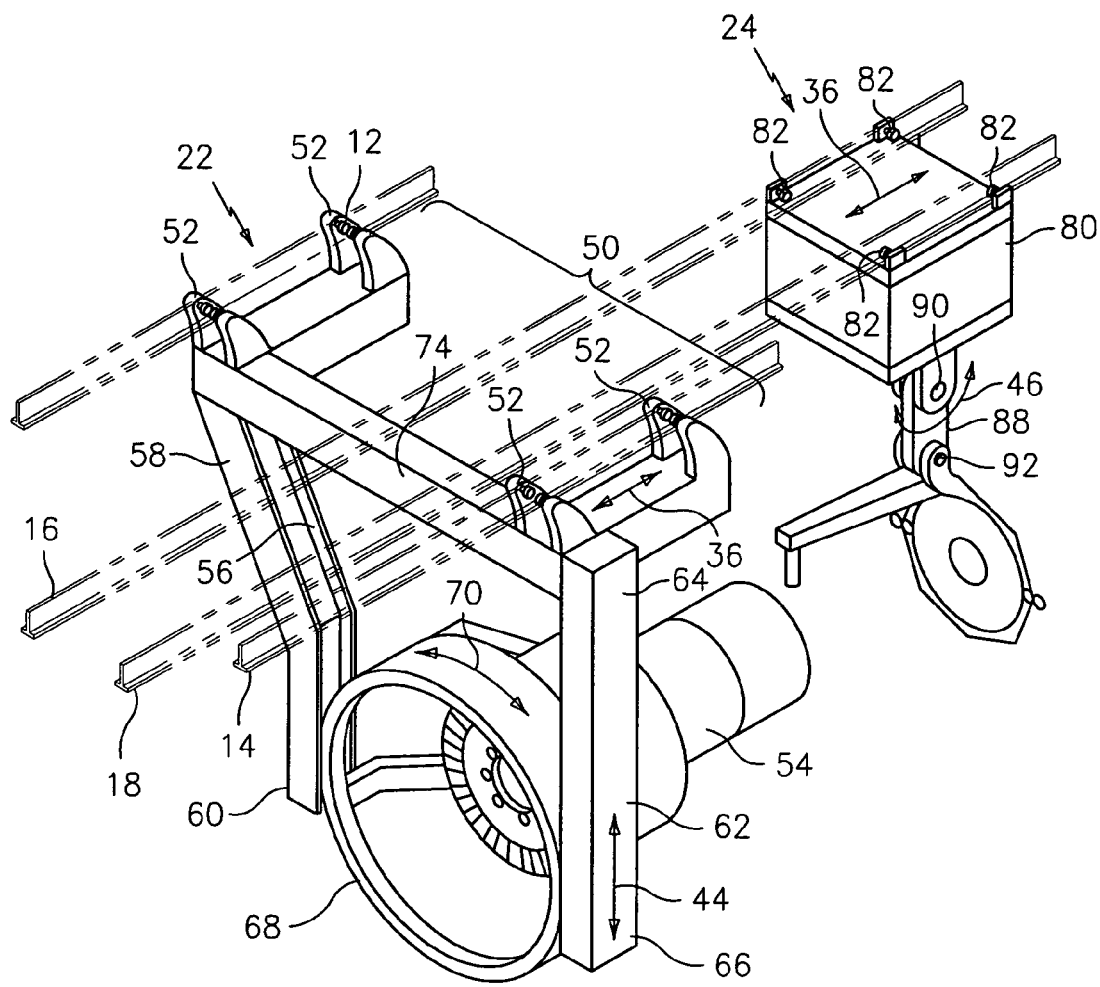
FIG. 2 is a representation of a core module maintained by a second carriage of FIG. 1.

Referring specifically now to FIG. 2, second carriage 22 may comprise a body 50, one or more mating features 52 complementary to a mating feature of rails 12, 14 mounted to body 50, and means for suspending a part 54 above the surface and moving part 54 in six or more directions. As mentioned above with respect to complementary mating feature 32 of first carriage 20, complementary mating features 52 may be disposed within rails 12, 14 to permit the movement of second carriage 22 in the direction(s) and range of motion allowed by rails 12, 14. The direction(s) and ranges of motion permitted by rails 12, 14 include those already described with respect to arrow 36. The means for suspending and moving said part 54 may comprise a first adjustable arm 56 comprising a first end 58 disposed in connection with body 50 and a second end 60 disposed in connection with part 54, a second adjustable arm 62 comprising a first end 64 disposed in connection with body 50 and a second end 66 disposed in connection with part 54, and a substantially circular harness capable 68 of accepting part 54. Body 50 may comprise a U-shaped cross-bar 74 to which both first adjustable arm 56 and second adjustable arm 62 are connected. Substantially circular harness 68 may concentrically maintain part 54 and permit its movement in a clockwise direction and a counter-clockwise direction as indicated by an arrow 70 about an axis 72. One of ordinary skill in the art will recognize that substantially circular harness 68 may also be known as a rollover ring. When part 54 is disposed within substantially circular harness 68, part 54 may be revolved about axis 72 so that the underside of part 54 may be exposed, and a worker may access the undercarriage of part 54 without the need to otherwise crawl underneath part 54. Substantially circular harness 68 may further comprise a lower half and an upper half such that lower half may disengage from part 54 while carriage 22 still safely maintains part 54 in position. Carriage 22 may further comprise an electronic device designed to track its movement in relation to the other carriages and ensure their alignment in all directions with respect to each other.

Figure 3:
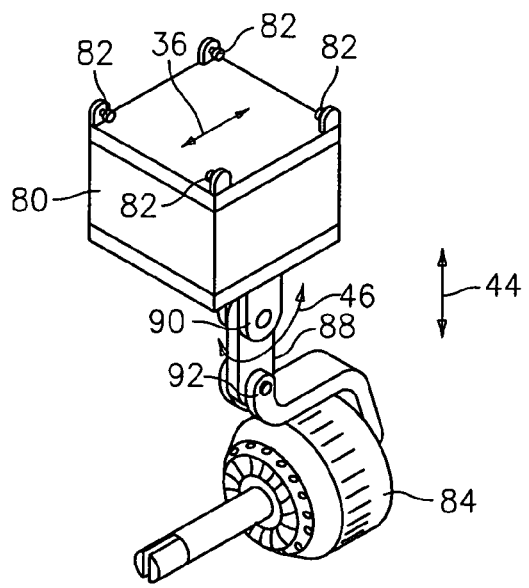
FIG. 3 is a representation of a low pressure turbine module maintained by a third carriage of FIG. 1.
Figure 4B:
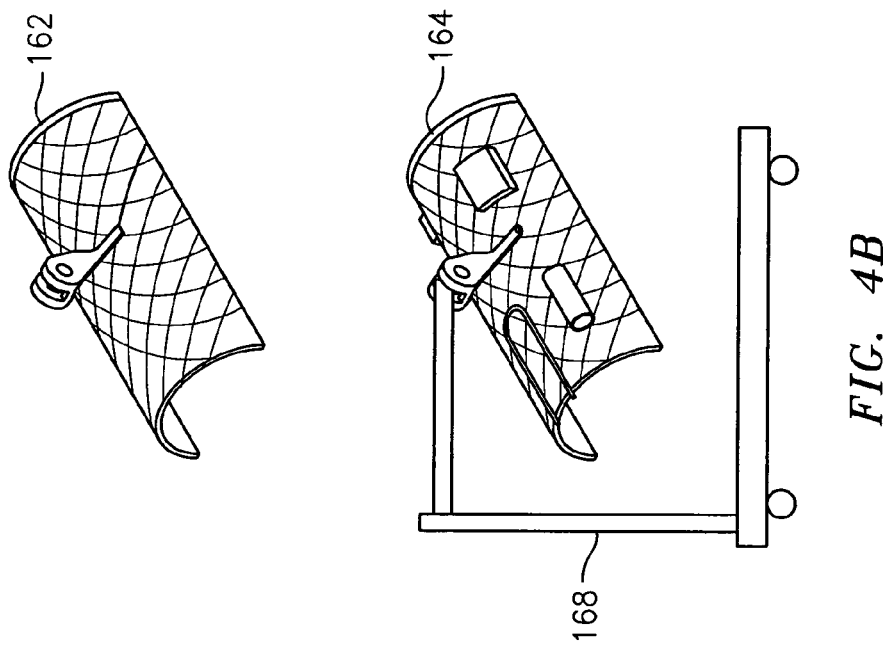
FIG. 4B is a representation of a loading cart for positioning one or more fan ducts with respect to the third carriage of FIG. 1.
Figure 4A:
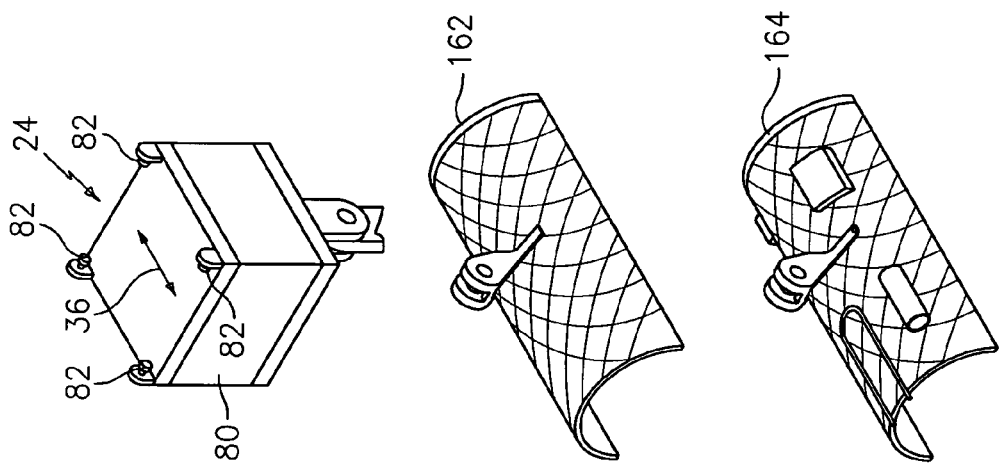
FIG. 4A is a representation of one or more fan ducts with respect to the third carriage of FIG. 1.

Referring specifically now to FIG. 3, third carriage 24 may comprise a body 80, one or more mating features 82 complementary to the mating feature of rails 16, 18 mounted to body 80 and means for suspending a part 84 above the surface and moving part 84 in four or more directions. Complementary mating features 82 may be disposed within rails 16, 18 to permit the movement of third carriage 80 in the direction(s) and range of motion allowed by rails 16, 18. Preferably, the directions and range of motion allowed by rails 16, 18 permit third carriage 80 to move horizontally as indicated by arrow 36. As described earlier, this movement may be characterized differently depending upon the location of a worker with respect to third carriage 80. The means for suspending and moving part 84 may comprise an adjustable arm 88 comprising a first end 90 disposed in connection with body 80 and a second end 92 disposed in connection with part 84. Adjustable arm 88 may be capable of permitting part 84 to move vertically upwards and downwards in relation to the surface below as indicated by an arrow 44. In the alternative, adjustable arm 88 may be disposed in connection with body 80 such that a pivot mount, swivel mount, rotatable mount, ball-joint socket mount or any mount permitting the three hundred sixty degree rotation of adjustable arm 88 within body 80 in a clockwise direction and a counter-clockwise direction as indicated by an arrow 46.

Referring specifically now to FIG. 5, fourth carriage 26 may comprise a body 100, one or more mating features 102 complementary to a mating feature of rails 12, 14 mounted to body 100, and means for suspending a part 104 above the surface and moving part 104 in six or more directions. Complementary mating features 102 may be disposed within rails 12, 14 to permit the movement of fourth carriage 26 in the direction(s) and range of motion allowed by rails 12, 14. The direction(s) and ranges of motion permitted by rails 12, 14 include those already described with respect to arrow 36. The means for suspending and moving said part 104 may comprise a first adjustable arm 106 comprising a first end 108 disposed in connection with body 100 and a second end 110 disposed in connection with a substantially circular harness support 120, a second adjustable arm 112 comprising a first end 114 disposed in connection with body 100 and a second end 116 disposed in connection with substantially circular harness support 120, and a substantially circular harness capable 118 of accepting part 104. As described earlier, first adjustable arm 106 and second adjustable arm 112 are capable of moving vertically upwards and downwards in relation to the surface and capable of moving horizontally in relation to the directions permitted by rails 12, 14 as indicated by arrow 36.

Referring again to FIG. 5, substantially circular harness support 120 comprises a cross-bar comprising a first end disposed in connection with said second end 110 of first adjustable arm 106, a second end disposed in connection with second end 116 of second adjustable arm 112, and a mount for substantially circular harness 118 disposed therebetween. As described earlier, the substantially circular harness may concentrically maintain the part and permit its movement in a clockwise direction and a counter-clockwise direction as indicated by an arrow 122 about an axis 72. One of ordinary skill in the art will recognize that substantially circular harness 118 may also be known as a rollover ring. Again, when a part is disposed within the substantially circular harness, the part may be revolved about axis 72 so that the underside of the part may be exposed and a worker may access the undercarriage of the part without the need to otherwise crawl underneath the part. Substantially circular harness may further comprise a lower half 118A and an upper half 118B which permits the removal of lower half 118A while still maintaining safely the part within carriage 26.

Figure 8:
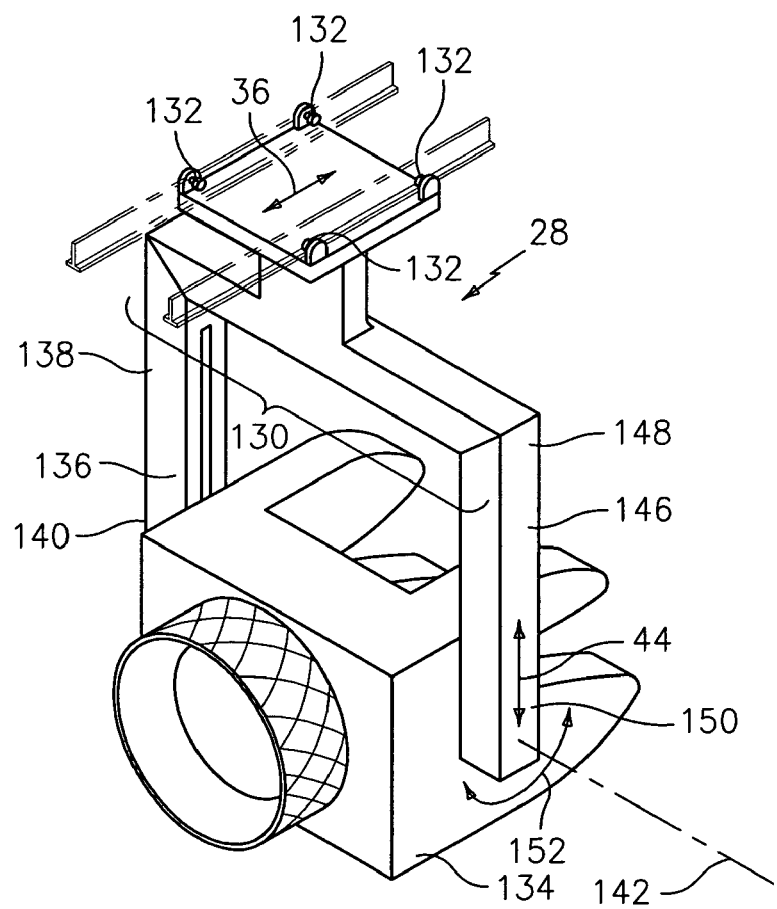
FIG. 8 is a representation of a nozzle received by the fifth carriage of FIG. 1.
Figure 9:
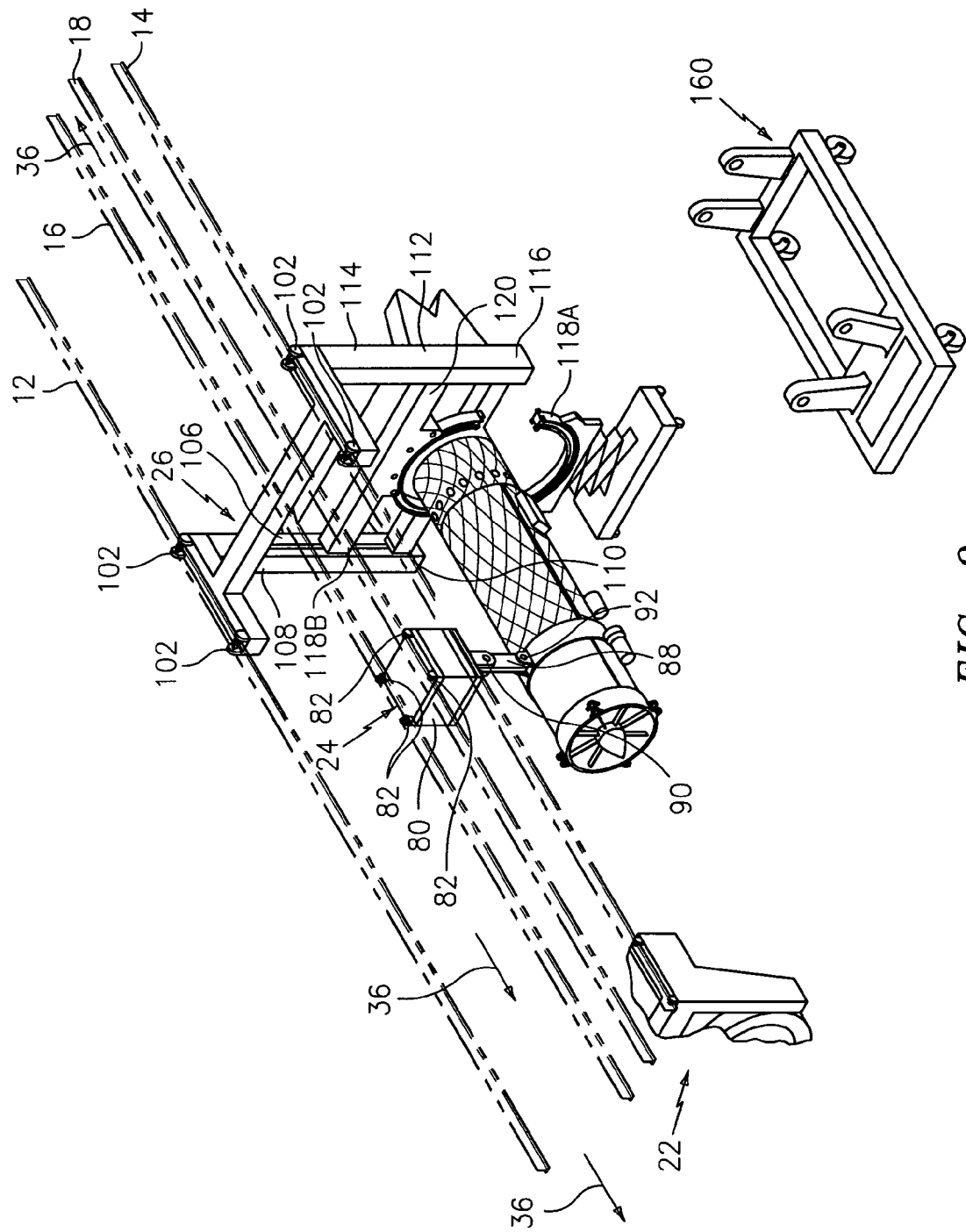
FIG. 9 is a representation of the removal of an engine from the quadrail ergonomic apparatus of FIG. 1.

Referring specifically now to FIG. 8, fifth carriage 28 may comprise a body 130, one or more mating features 132 complementary to a mating feature of rails 16, 18 mounted to body 130, and means for suspending a part 134 above the surface and moving part 134 in six or more directions. Complementary mating features 132 may be disposed within rails 16, 18 to permit the movement of fifth carriage 28 in the direction(s) and range of motion allowed by rails 16, 18. The direction(s) and ranges of motion permitted by rails 16, 18 include those already described with respect to arrow 36. The means for suspending and moving part 134 comprises a first adjustable arm 136 comprising a first end 138 disposed in connection with said body 130 and a second end 140 disposed in connection with part 134 and comprising means for rotating a part about axis 142 parallel to the surface disposed in connection with part 134, and a second adjustable arm 146 comprising a first end 148 disposed in connection with body 130 and a second end 150 comprising means for rotating a part about axis 142 parallel to the surface disposed in connection with part 134. The means for rotating a part may be capable of rotating part 134 about axis 142 in a clockwise direction and a counter-clockwise direction as indicated by an arrow 152. As described earlier, first adjustable arm 136 and second adjustable arm 146 are capable of moving vertically upwards and downwards in relation to the surface and capable of moving horizontally in relation to the directions permitted by rails 16, 18 as indicated by arrow 36.

For purposes of explaining the capabilities and use of the apparatus described herein, and not to be taken in a limiting sense, quadrail ergonomic apparatus 10 will be described with respect to its use in assembling a gas turbine engine for an aircraft. Although the assembly of a gas turbine engine may encompass one or more of the following steps in any particular order, the steps outlined are merely representative and do not constitute the only sequence and/or method(s) for assembling a gas turbine engine using the quadrail ergonomic apparatus described herein. Throughout the assembly process, the vertical height(s) and horizontal and rotational positioning of each part may be continuously adjusted to maintain an ergonomic work zone.

Referring back to FIG. 1, quadrail ergonomic apparatus 10 may be mounted to a static structure (not shown) such that rails 12, 14, 16, 18 are mounted above a surface (not shown) and carriages 20, 22, 24, 26, 28 are suspended from the aforementioned rails via their respective mating parts and complementary mating parts. A core, or part 84, may be positioned to be received by carriage 24. The core may at least comprise a turbine, a compressor and a combustor, already assembled. The core may be positioned beneath carriage 24 using any number of transportation devices such as, but not limited to, a CAPTAM stand, a loading cart, a side loading cart, and the like. For purposes of illustration, and not to be taken in a limiting sense, a captan stand 160 may be utilized to position the core. Once the core is received by carriage 24, carriage 24 may load the core onto carriage 22 such that the core may be concentrically received by substantially circular harness 68. Carriage 24 may be positioned to engage carriage 22 using rails 16, 18 while moving in the direction indicated by arrow 36. Once received by carriage 22, the core may be moved horizontally (arrow 36), vertically (arrow 44) and rotated about axis 72 (arrow 70) to permit workers complete access to the surface of the core.

Carriage 22 may then determine whether the carriages are aligned vertically and horizontally with respect to one other and emits a signal to indicate that proper alignment is achieved. Once alignment is confirmed, carriage 24 may then receive other parts such as a low pressure turbine module (part 84), an upper fan duct (a part 162) and a lower fan duct (a part 164), not necessarily in that order, for assembly with the core (see FIG. 4B). As described earlier, these parts may be positioned to be received by carriage 24 using any one of, or a combination of, the aforementioned transportation devices, and the like, such as a side loading cart 168. Afterwards, carriage 24 may receive an augmentor duct (part 104) positioned using an aforementioned transportation device. Carriage 24 may engage carriage 26 and load the augmentor duct therein such that the augmentor duct may be concentrically disposed within substantially circular harness 118. Carriage 26 may then maintain the augmentor duct and permit workers to position the duct vertically and horizontally as well as rotate the duct in the directions indicated by arrow 122 along axis 72. (see FIG. 5)

A fan module, e.g., part 34, may be positioned to be received by carriage 20 using any one of the aforementioned transportation devices. Carriage 20 may engage carriage 22 at least in one of the directions indicated by arrow 36 in order to assemble together the fan module and core (part 54) maintained by carriage 22.

A nozzle, e.g., part 134, may be positioned to be received by carriage 28 using any one of the aforementioned transportation devices. Carriage 28 may engage 26 at least in one of the directions indicated by arrow 36 in order to assemble together the nozzle with the augmentor duct (part 104) maintained by carriage 26.

External plumbing, controls and an accessory gearbox 166, and other parts not mentioned but within the scope of the aforementioned assembly process, may be ergonomically installed at the "ideal" angular and vertical location(s) relative to the workers perspective as is recognized and appreciated by one of ordinary skill in the art.

Throughout the above-enumerated assembly process and afterwards, the weight of the gas turbine engine may be principally supported by carriages 24, 26, which permits the removal of carriage 22 at some point as determined by one of ordinary skill in the art. A lower half of substantially circular harness 118A may be removed from carriage 26 such that lower half 118A may disengage from the gas turbine engine. The gas turbine engine is still maintained safely by carriages 24, 26. The gas turbine engine may then be lowered downwards as indicated by arrow 44 towards the surface and onto one of the aforementioned transportation devices.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A quadrail ergonomic apparatus, comprising:
    two or more pathways designed to permit movement in two or more directions mounted to a static object above a surface;
    one or more carriages designed to move in two or more directions disposed within said two or more pathways;
    wherein:
        each carriage is suspended above said surface from said pathways and is capable of maintaining a workload in place and permitting movement of said workload in at least four directions, wherein said one or more carriages comprise a first carriage, a second carriage, a third carriage, a fourth carriage and a fifth carriage;
        said second carriage comprises:
            a body;
            one or more mating features complementary to a mating feature of said two or more pathways mounted to said body; and
            means for suspending said workload above said surface and moving said workload in six or more directions; and
        said means for suspending and moving said workload comprise a first adjustable arm comprising a first end disposed in connection with said body and a second and end disposed in connection with said workload, a second adjustable arm comprising a first end disposed in connection with said body and a second end disposed in connection with said workload, and a substantially circular harness capable of accepting said workload.

2. The quadrail ergonomic apparatus of claim 1, wherein said first adjustable arm and said second adjustable arm are capable of moving vertically upwards and downwards in relation to said surface and capable of moving horizontally in relation to said two or more pathways.

3. The quadrail ergonomic apparatus of claim 1, wherein said substantially circular harness is designed to concentrically accept and hold said workload.

4. The quadrail ergonomic apparatus of claim 1, wherein said substantially circular harness is capable of rotating in a clockwise direction and a counter-clockwise direction about an axis of an engine centerline.

5. The quadrail ergonomic apparatus of claim 1, wherein said first adjustable arm and said second adjustable arm are disposed in connection with said body by a cross-bar.

6. The quadrail ergonomic apparatus of claim 1, wherein said third carriage comprises:
    a body;
    one or more mating features complementary to a mating feature of said two or more pathways mounted to said body; and
    means for suspending said workload above said surface and moving said workload in four or more directions.

7. The quadrail ergonomic apparatus of claim 6, wherein means for suspending and moving said workload comprise an adjustable arm comprising a first end disposed in connection with said body and a second end disposed in connection with said workload.

8. The quadrail ergonomic apparatus of claim 6, wherein said adjustable arm is capable of moving vertically upwards and downwards in relation to said surface, capable of moving horizontally in relation to said two or more pathways, and capable of rotating in a clockwise and a counter-clockwise direction in relation to an axis of said body.

9. The quadrail ergonomic apparatus of claim 6, wherein said fourth carriage comprises:
    a body;
    one or more mating features complementary to a mating feature of said two or more pathways mounted to said body; and
    means for suspending said workload above said surface and moving said workload in six or more directions.

10. A quadrail ergonomic apparatus, comprising:
    two or more pathways designed to permit movement in two or more directions mounted to a static object above a surface;
    one or more carriages designed to move in two or more directions disposed within said two or more pathways;
    wherein:
        each carriage is suspended above said surface from said pathways and is capable of maintaining a workload in place and permitting movement of said workload in at least four directions, wherein said one or more carriages comprise a first carriage, a second carriage, a third carriage, a fourth carriage and a fifth carriage;
        said fourth carriage comprises:
            a body;
            one or more mating features complementary to a mating feature of said two or more pathways mounted to said body; and
            means for suspending said workload above said surface and moving said workload in six or more directions; and
        said means for suspending and moving said workload comprise a first adjustable arm comprising a first end disposed in connection with said body and a second end disposed in connection with a substantially circular harness support, a second adjustable arm comprising a first end disposed in connection with said body and a second end disposed in connection with said substantially circular harness support, said substantially circular harness support, and a substantially circular harness capable of accepting said workload.

11. The quadrail ergonomic apparatus of claim 10, wherein said first adjustable arm and said second adjustable arm are capable of moving vertically upwards and downwards in relation to said surface and capable of moving horizontally in relation to said two or more pathways.

12. The quadrail ergonomic apparatus of claim 10, wherein said substantially circular harness is designed to concentrically accept and hold said workload.

13. The quadrail ergonomic apparatus of claim 10, wherein said substantially circular harness is capable of rotating in a clockwise direction and a counter-clockwise direction about an axis of an engine centerline.

14. The quadrail ergonomic apparatus of claim 10, wherein said substantially circular harness support comprises a crossbar comprising a first end disposed in connection with said first adjustable arm, a second end disposed in connection with said second adjustable arm, and a mount for said substantially circular harness disposed therebetween.

15. The quadrail ergonomic apparatus of claim 10, wherein said first adjustable arm and said second adjustable arm are disposed in connection with said body by a U-shaped crossbar.

16. A quadrail ergonomic apparatus, comprising:
two or more pathways designed to permit movement in two or more directions mounted to a static object above a surface;
one or more carriages designed to move in two or more directions disposed within said two or more pathways;
wherein:
each carriage is suspended above said surface from said pathways and is capable of maintaining a workload in place and permitting movement of said workload in at least four directions, wherein said one or more carriages comprise a first carriage, a second carriage, a third carriage, a fourth carriage and a fifth carriage;
said fifth carriage comprises:
a body;
one or more mating features complementary to a mating feature of said two or more pathways mounted to said body; and
means for suspending said workload above said surface and moving said workload in six or more directions; and
said means for suspending and moving said workload comprises a first adjustable arm comprising a first end disposed in connection with said body and comprising means for rotating said workload about an axis parallel to said surface and a second end disposed in connection with said workload and comprising means for rotating said workload about said axis parallel to said surface, and a second adjustable arm comprising a first end disposed in connection with said body and a second end disposed in connection with said workload.

17. The quadrail ergonomic apparatus of claim 16, wherein said means for rotating said workload of said first adjustable arm and said second adjustable arm are capable of rotating said workload in a clockwise direction and a counter-clockwise direction.

18. The quadrail ergonomic apparatus of claim 16, wherein said first adjustable arm and said second adjustable arm are capable of moving vertically upwards and downwards in relation to said surface and capable of moving horizontally in relation to said two or more pathways.

19. The quadrail ergonomic apparatus of claim 16, wherein said first adjustable arm and said second adjustable arm are disposed in connection with said body by a cross-bar.

20. A method for ergonomically assembling an apparatus using a quadrail ergonomic apparatus, comprising:

two or more pathways designed to permit movement in two or more directions mounted to a static object above a surface;
one or more carriages designed to move in two or more directions disposed within said two or more pathways;
wherein:
each carriage is suspended above said surface from said pathways and is capable of maintaining a workload in place and permitting movement of said workload in at least four directions, wherein said one or more carriages comprise a first carriage, a second carriage, a third carriage, a fourth carriage and a fifth carriage;
said second carriage comprises:
a body;
one or more mating features complementary to a mating feature of said two or more pathways mounted to said body; and
means for suspending said workload above said surface and moving said workload in six or more directions; and
said means for suspending and moving said workload comprise a first adjustable arm comprising a first end disposed in connection with said body and a second end disposed in connection with said workload, a second adjustable arm comprising a first end disposed in connection with said body and a second end disposed in connection with said workload, and a substantially circular harness capable of accepting said workload,
the method comprising:
providing five or more said carriages disposed in connection with said two or more pathways mounted to said static object above said surface;
disposing said workload in two or more of said five or more carriages;
positioning each carriage containing said workloads in a spatial relationship to one another; and
assembling each of said workloads together using each of said carriages to form the apparatus.

21. The method of claim 20, further comprising manipulating an orientation of each of said workloads within each of said carriages.

22. The method of claim 20, wherein providing comprises providing five carriages disposed in connection with four pathways.

23. The method of claim 20, wherein disposing comprises disposing a first said workload in a first said carriage, a second said workload in a second said carriage, a third said workload in a third said carriage, a fourth said workload in a fourth said carriage and a fifth said workload in a fifth said carriage.

24. The method of claim 20, wherein positioning further comprises:
moving said first carriage to a position relative to said second carriage;
moving said second carriage to a position relative to said first carriage and said third carriage;
moving said third carriage to a position relative to said second carriage and said fourth carriage;
moving said fourth carriage to a position relative to said third carriage and said fifth carriage; and
moving said fifth carriage to a position relative to said fourth carriage.

25. The method of claim 24, wherein moving each of said carriages comprises moving each of said carriages in a horizontal direction relative to each other and said two or more pathways.

26. The method of claim 20, wherein assembling further comprises:

positioning a first said workload disposed within a first said carriage in one or more directions with respect to a position of a second said workload disposed within a second said carriage;

positioning said second workload in one or more directions with respect to said position of said first workload and a position of a third said workload disposed within a third said carriage;

positioning said third workload in one or more directions with respect to said position of said second workload and a position of a fourth said workload disposed within a fourth said carriage;

positioning said fourth workload in one or more directions with respect to said position of said third workload and a position of a fifth said workload disposed within a fifth said carriage; and moving each of said workloads and said carriages into positions relative to one another in order to assemble said workloads together to form said apparatus.

27. An apparatus in combination with a plurality of workloads, the workloads comprising turbine engine components and the apparatus comprising:

a first pathway and a second pathway;

a plurality of carriages, including a first plurality of carriages for carrying associated workloads suspended from the first pathway and a second plurality of carriages for carrying associated workloads suspended from the second pathway, each said carriage movable forward and backward along the associated pathway and permitting movement of the associated workload up and down, each said carriage further positionable to maintain its associated workload along an axis in common with the other carriages.

28. The combination of claim 27, wherein said first pathway comprises a first pair of rails and said second pathway comprises a second pair of rails.

29. The combination of claim 28, wherein the second pair of rails is inboard of the first pair of rails.

30. The combination of claim 27, wherein at least one of said carriages comprises a harness capable of rotating its associated workload about said common axis.

31. The combination of claim 27, wherein said components include:

a turbine engine core received by a rotary harness of one of the first plurality of carriages; and a fan module carried by one of the second plurality of carriages.

32. The combination of claim 31, wherein said first pathway comprises a first pair of rails and said second pathway comprises a second pair of rails.

33. The combination of claim 27, wherein the second pair of rails is inboard of the first pair of rails.

34. The combination of claim 27, wherein said first pathway and second pathway are mounted to a static structure above a surface, the workloads being carried above said surface.

35. A method for using an apparatus in combination with a plurality of workloads, the workloads comprising turbine engine components and the apparatus comprising:

a first pathway and a second pathway;

a plurality of carriages, including a first plurality of carriages for carrying associated workloads suspended from the first pathway and a second plurality of carriages for carrying associated workloads suspended from the second pathway, each said carriage movable forward and backward along the associated pathway and permitting movement of the associated workload up and down, each said carriage further positionable to maintain its associated workload along an axis in common with the other carriages, the method comprising:

positioning a first said workload in a carriage of the second plurality of carriages; and moving the workload via said one of the second plurality of carriages to be received by one of the first plurality of carriages.

36. The method of claim 35, further comprising disengaging said one of the second plurality of carriages from the workload.

37. The method of claim 36, further comprising using said one of the second plurality of carriages to receive another said workload.

* * * * *